(12) United States Patent
Jojic et al.

(10) Patent No.: US 8,126,829 B2
(45) Date of Patent: Feb. 28, 2012

(54) SOURCE SEGMENTATION USING Q-CLUSTERING

(75) Inventors: Nebojsa Jojic, Redmond, WA (US); Manuel Jesus Reyes-Gomez, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1279 days.

(21) Appl. No.: 11/769,928

(22) Filed: Jun. 28, 2007

(65) Prior Publication Data

US 2009/0006038 A1    Jan. 1, 2009

(51) Int. Cl.
*G06F 17/00* (2006.01)
*G06N 5/00* (2006.01)

(52) U.S. Cl. .............................. 706/45; 706/46; 706/62
(58) Field of Classification Search .................. None
See application file for complete search history.

(56) References Cited

U.S. PATENT DOCUMENTS

| | | | |
|---|---|---|---|
| 6,799,170 B2 | 9/2004 | Lee et al. | |
| 6,931,362 B2 | 8/2005 | Beadle et al. | |
| 7,088,831 B2 | 8/2006 | Rosca et al. | |
| 7,099,821 B2 | 8/2006 | Visser et al. | |
| 2002/0116187 A1 | 8/2002 | Erten | |
| 2003/0185411 A1 | 10/2003 | Atlas et al. | |
| 2006/0256978 A1 | 11/2006 | Balan et al. | |

FOREIGN PATENT DOCUMENTS

| | | |
|---|---|---|
| WO | WO2006064699 A1 | 6/2006 |
| WO | WO2006078003 A2 | 7/2006 |
| WO | WO2006082868 A3 | 12/2006 |

OTHER PUBLICATIONS

Reyes-Gomez et al., M., "Signal Separation by Efficient Combinatorial Optimization", Microsoft, pp. 1-8, 2005.*
Huang et al., D., "When Clusters Meet Partitions: New Density-Based Methods for Circuit Decomposition", IEEE, pp. 60-64, 1995.*
Rojas, et al. "Nonlinear Blind Source Separation Using Genetic Algorithms," http://citeseer.ist.psu.edu/cache/papers/cs/26953/http:zSzzSzica2001.ucsd.eduzSzindex_fileszSzpdfszSz030-rojas.pdf/rojas01nonlinear.pdf, last accessed Jan. 25, 2007, 6 pages.
Puntonet, et al. "Separation of sources using simulated annealing and competitive learning," Neurocomputing 49, Elsevier Science B.V., 2002, 22pages.
Ye Tian, et al., "Fuzzy Clustering and Bayesian Information Criterion Based Threshold Estimation for Robust Voice Activity Detection", IEEE International Conference on, Apr. 6-10, 2003, 4 pages.
Mukund, et al., "Q-Clustering", Advances in Neural Information Processwg Systems, 2006, 8 pages.
Brendan J. Frey, et al., "Transformation-Invariant Clustering Using the EM-Algorithm", IEEE Transactions on Pattern Analysis and Machine Intelligence. vol. 25, No. I , Jan. 2003, 18 pages.
International Search Report & Written Opinion dated Dec. 10, 2008 for PCT Application Serial No. PCT/US2008/068501, 9 Pages.

* cited by examiner

*Primary Examiner* — Jeffrey A Gaffin
*Assistant Examiner* — Adrian L Kennedy
(74) *Attorney, Agent, or Firm* — Lee & Hayes, PLLC

(57) ABSTRACT

A system and method that facilitates and effectuates accurate source segmentation of multi-dimensional signals in a computationally efficient manner. By employing Queyranne's algorithm along with a model for combining adjacent multi-dimensional elements of signal into locally consistent regions, significant improvement in time to identify an optimal segmentation can be achieved. Additional, by saving values computed when executing the algorithm and recalling the values when needed during subsequent iterations of the algorithm provides an additional in algorithm execution speed.

20 Claims, 12 Drawing Sheets

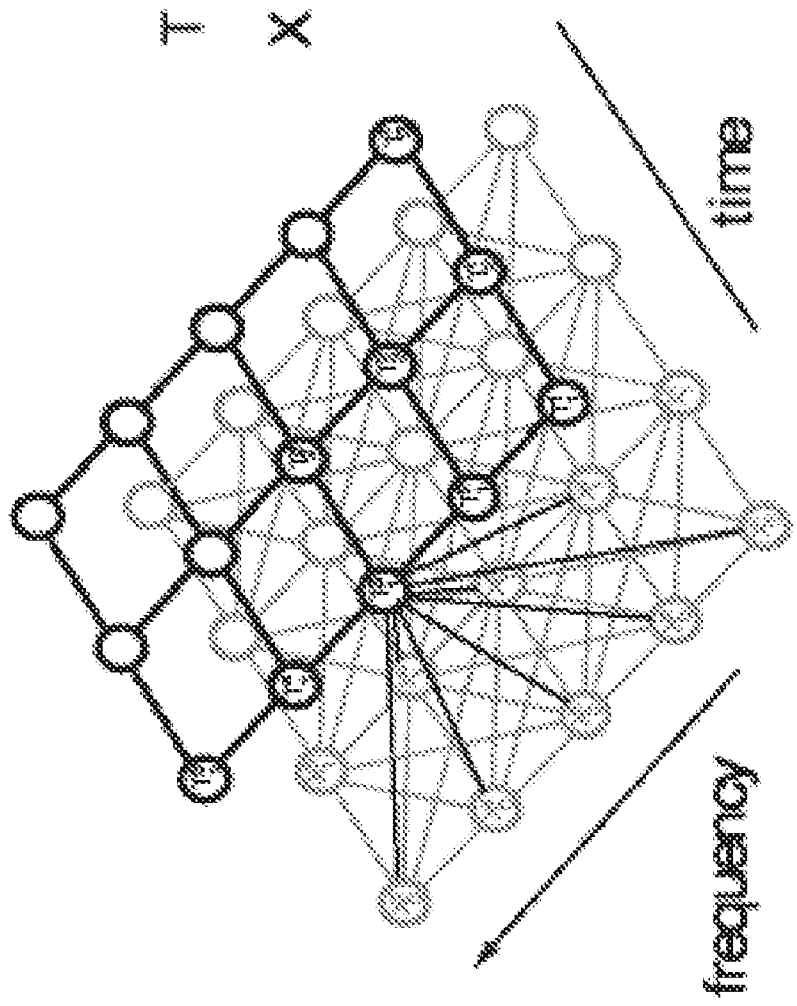
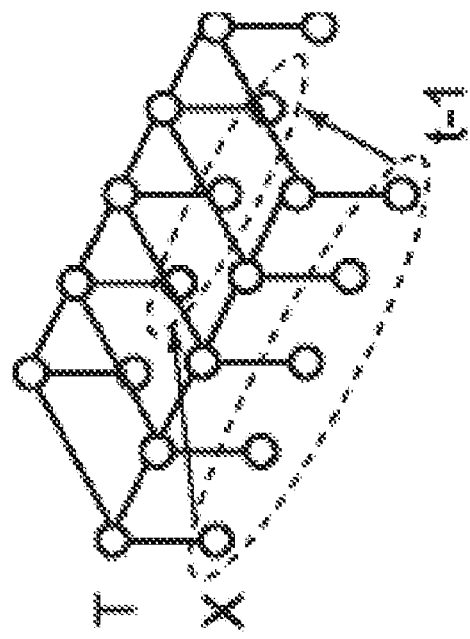
FIG. 2A
FIG. 2B

SOURCE SEGMENTATION USING Q-CLUSTERING

BACKGROUND

Multidimensional signals such as audio, image, and video signals on many occasions need to be segmented in order to identify the source of each segment of the signal or isolate the segments of the signal related to a source. The analysis of audio signals for a wide variety of applications, such as speech recognition and content based retrieval, assumes that the signals originated from a single source. However, this is frequently not the case for a single channel audio signal. For example, a recorded audio signal can include audio content from two speakers that may need to be segmented according to the respective speakers. In another example, a photograph of an individual may require that the image be segmented such that the segment containing the individual is separated from the background segment. Source segmentation is known to be a difficult problem and computationally resource intensive. There is a need to provide accurate source segmentation of multi-dimensional signals in a computationally efficient manner.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

In accordance with one or more aspects and corresponding disclosure thereof, various features are described in connection with employing tractable combinatorial optimization techniques, such as variations of Queyranne's algorithm, in order to segment multidimensional signals into their signal sources. In one aspect, the optimization criterion is the likelihood under a generative model which assumes that each multi-dimensional bin is assigned to only one of the sources, and that each sources signal has been generated from the same generic model. In another aspect, the signal can be presegmented into a large number of segments that does not violate the above assumptions. In another aspect, the results of calculations performed within the algorithm are reused in order to reduce resource utilization and reduce time to identify the best segmentation. Yet another aspect utilizes random selection of a subset of the segments during each iteration of the algorithm in order to further reduce computation intensity and time to identify source segmentation. However, when random sampling is employed, the best solution is not guaranteed, but a good segmentation is identified. Another aspect involves cascading multiple executions of the source segmentation algorithm in order to segment more than two sources.

The invention is applicable to any application involving separation of sources from a multi-dimensional signal. For example, an audio signal can be segmented by each audio source. Some example applications for audio signal source segmentation are: separating a voice from background noise, such as in a telephone conversation; separating feedback from a presenter's voice during a speech; speech recognition; classification of an audio file or segments of an audio file based upon audio signal content, such as cheering, clapping, speech; security analysis, such as voice recognition. In another example, an image or video signal can be segmented according to source. Some example applications for image and/or video signal segmentation are: security analysis, such as identification of an individual or object in an image or video; segmenting a person in a picture from their background; video editing, such as separating an object from the rest of the video in order to apply an alternate background or alter the object in the video.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 2A illustrates a generative graphical model of the transformation in FIG. 1.

FIG. 2B illustrates a simplification of the generative graphical model of FIG. 2A.

DETAILED DESCRIPTION

Figure 1:
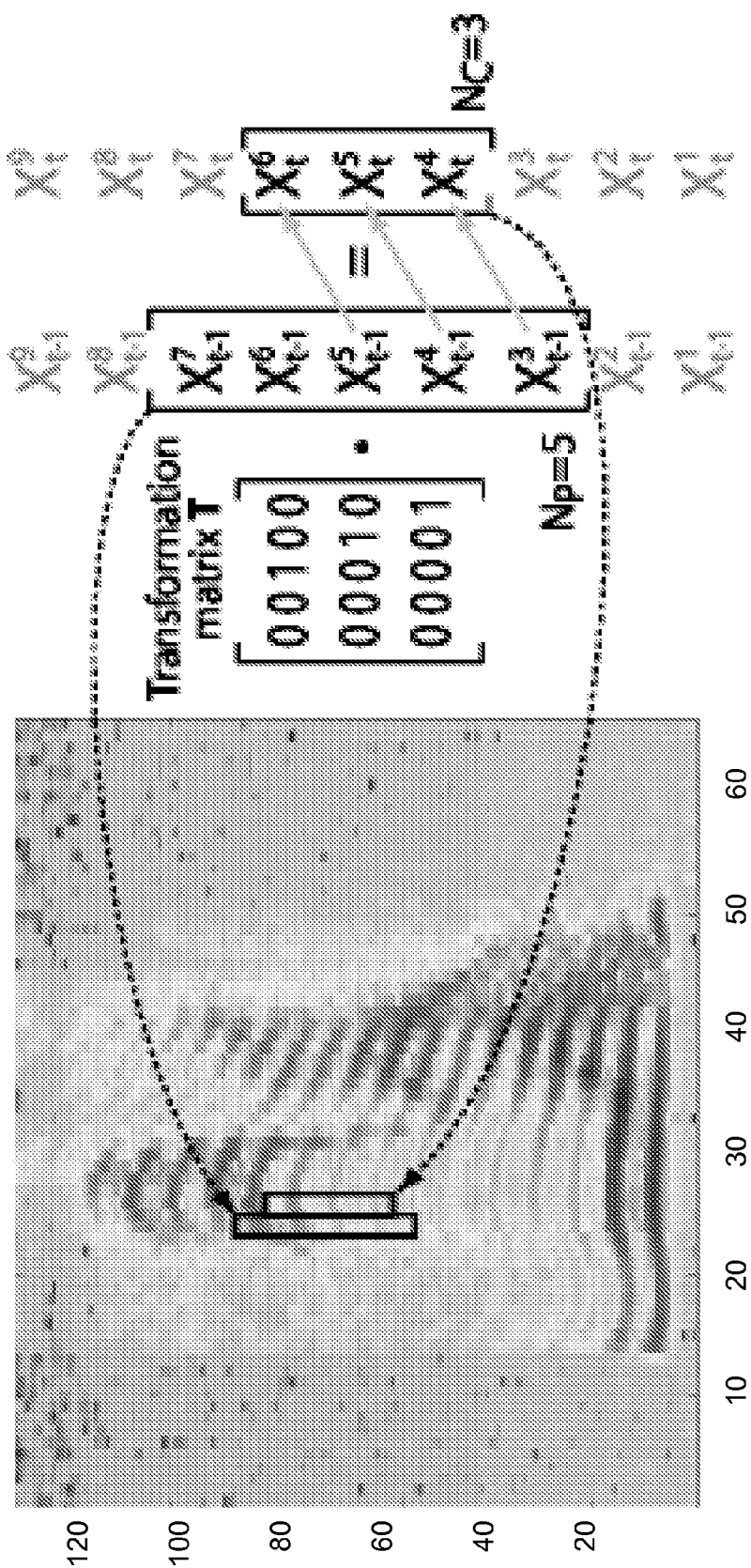
FIG. 1 illustrates a narrow band spectrogram representation of a speech signal.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details.

In other instances, well-known structures and devices are shown in block diagram form in order to facilitate a description thereof.

Throughout the discussion below, experimental results based on exemplary sets of data are presented to further support or illustrate various aspects of the subject application. It should be appreciated and understood that such experiments are not intended to limit the scope of the systems and methods described herein to particular scenarios, operating conditions or applications but are provided as examples. Moreover, the subject application can be employed with respect to any type of searching performed on the Internet, on a remote or local server, storage facility, or on any computing device or network.

Figure 10:
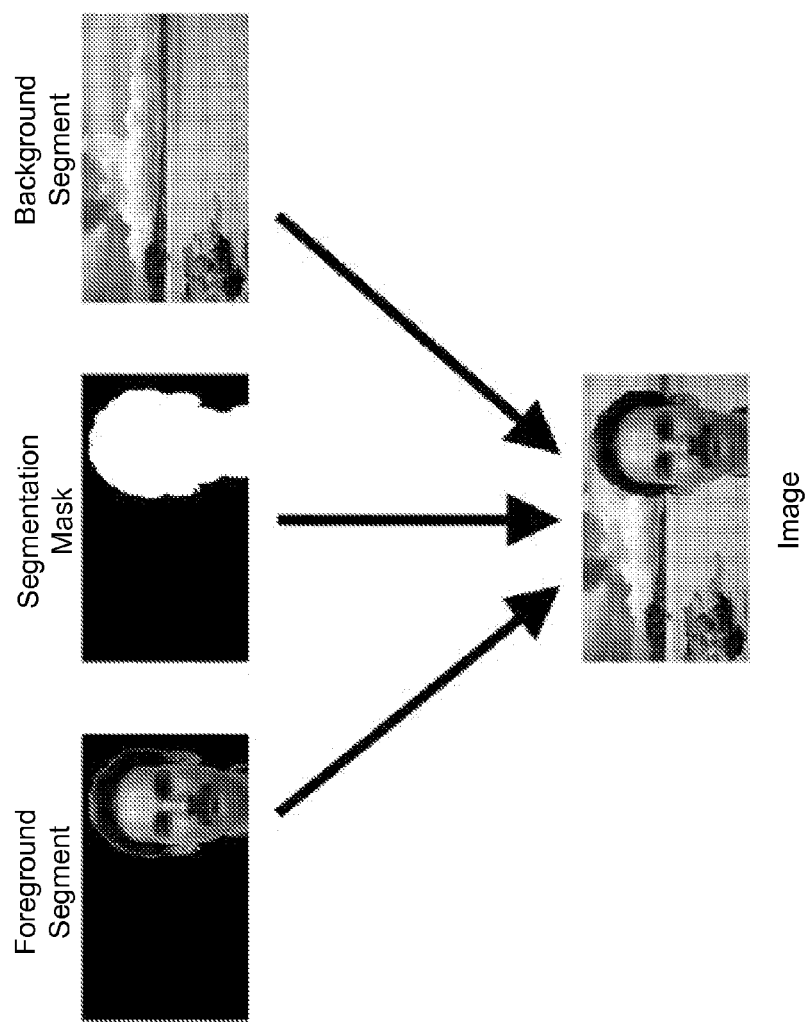
FIG. 10 illustrates one example of how an image signal can be optimally separated into foreground and background partitions
Figure 11B:
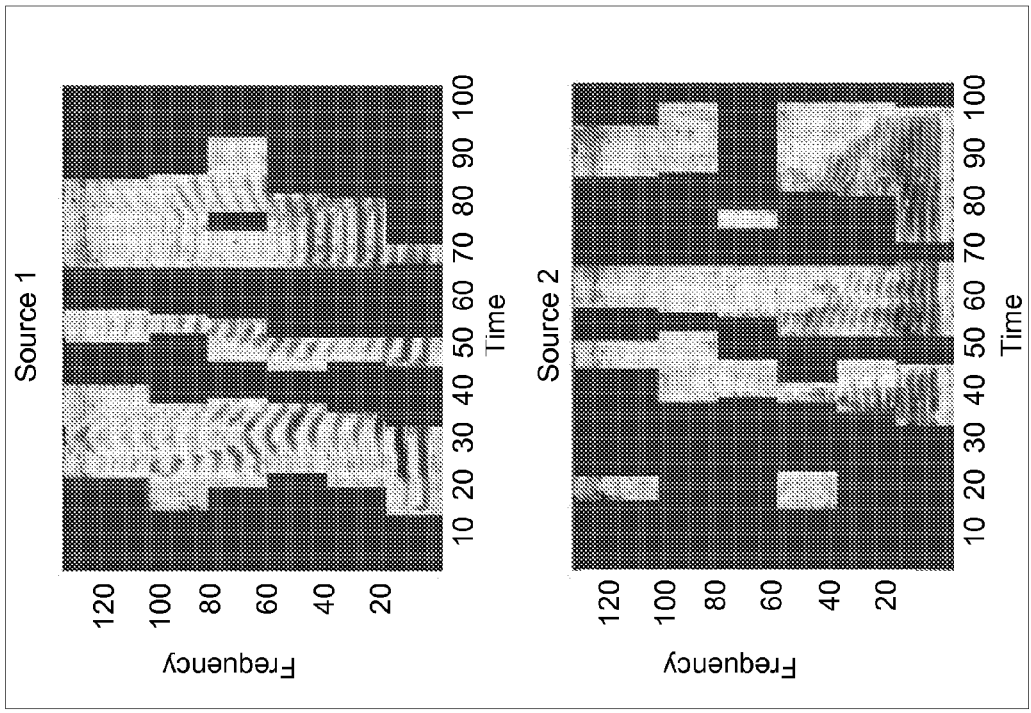
FIG. 11B illustrates an example of how the mixed audio signal of FIG. 11A can be optimally separated into partitions according to two sources.
Figure 11A:
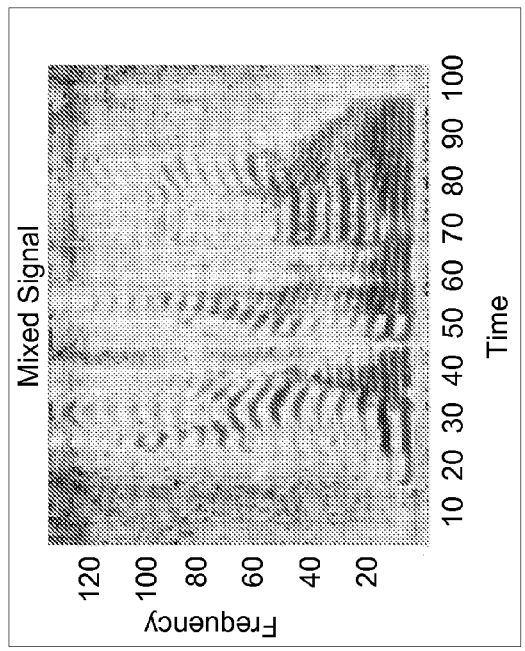
FIG. 11A illustrates one example of a spectrogram of a mixed audio signal.

Signal source segmentation involves the analysis of multi-dimensional signals $X=\{x_i : i \in V\}$, where V is the domain of the signal. For example, a 255×255 image has two dimensional (2-D) indices $i=(i,j) \in [1 \ldots 255] \times [1 \ldots 255]$. FIG. 10, shows an example of an image that is separated into a foreground segment and a background segment with a segmentation mask that indicates whether pixels from the image belong to the foreground segment or background segment. An audio spectrogram also has 2-D time-frequency indices $i=(t, f) \in [1 \ldots T] \times [1 \ldots F]$, where T is the number of time samples, and F is the number of frequency bins in the representation. We will refer to $x_i$ as elements of the signal. FIG. 11A shows and example of a spectrogram of a mixed audio signal from two sources. FIG. 11B shows an example of segmenting the audio signal from FIG. 11A by assigning each time/frequency bin according to their respective sources, 1 and 2. Consider a class of signals drawn from the (trainable) joint probability distribution $p(Y|\theta)$, and an observed mixture X of two signals (sources) of this class. The mixing is approximated assuming that each mixed signal component $x_i$ comes from one of the two individual sources. For images, this assumption is made as individuals pixels can be tied to a particular source. This assumption can also be made for audio signals given that the time-frequency representation of audio signals, for example speech, is very sparse: since most narrow frequency bands carry substantial energy only during a small fraction of time and therefore is rare to encounter two independent sources with large amounts of energy at the same frequency band at the same time. The invention is applicable to any multi-dimensional signal, for example, audio, image, or video signals.

Having a set $S \subset V$ as the set of observed elements to be assigned to the first source, then the log likelihood of the observed signal given the assignment S is:

$$\log(p(X|S)) = \log(p(X_S|\theta)) + \log(p(X_{V\setminus S}|\theta)) \qquad \text{Equation (1)}$$

where $X_A = \{x_i : i \in A\}$, and so $X_S$ and $X_{V\setminus S}$ constitute a partition of the signal into two segments. Note that $p(X_A|\theta) = \Sigma_{X_{V\setminus A}} p(X|\theta)$, and that the above log likelihood is a symmetric set function ($\log p(X|S) = \log p(X|V\setminus S)$), as the two sources are assumed to follow the same probability distribution.

Consider signal segmentation as a search for the partition that maximizes this likelihood. Queyranne's algorithm, which has complexity $O(|V|^3)$, can be employed to accomplish this maximization problem. The complexity can be reduced if the signal comes pre-segmented into a large number of smaller regions $R_i$, where $i \in 1 \ldots N$ and N is an integer, and the search is limited to the unions of these regions. In this case, the algorithm has a complexity $O(|N|^3)$.

It is well known that several types of clustering criteria can be reduced to functions that can be optimized using Queryanne algorithm, whose complexity is $O(|V|^3)$. For example, separating sites in genetic sequences into two clusters such that the mutual information between clusters is minimized can be performed exactly using this algorithm. Their optimization criterion can also be shown as equivalent to the minimal description length criterion:

$$f(S) = H(X_S) + H(X_{V\setminus S}), \qquad \text{Equation (2)}$$

where $$H(X_A) \simeq -\sum_{X_A} p(X_A) \log(p(X_A)), \qquad \text{Equation (3)}$$

is the entropy of the observations at indices in A. The task of separating sequence sites is defined as finding the partition (S, V\S), for which the sum of the two entropies is minimized. To estimate the entropy, multiple genetic sequences are observed under the assumption that a single partition should work for all sequences. The optimization criterion is a symmetric and submodular function, and so Queryanne's algorithm can be used to find optimal S in $O(|V|^3)$ time. The resulting segmentation guarantees, that $X_S$ and $X_{V\setminus S}$, over the observed sequences, are as independent of each other as possible. The entropy $H(X_A)$ is clearly related to log-likelihood. To estimate entropy of a signal segment S for a class of signals $X_k$ sampled from a distribution $p(X|\theta)$, the following equation can be used:

$$H(X_A) \simeq -\sum_k \log(p(X_A^k|\theta)), \qquad \text{Equation (4)}$$

where samples $X_A^k$ are used as an empirical distribution instead of the true distribution. If the empirical distribution truly matches the model distribution, the entropy estimate will be correct. Thus, the MDL criterion $f(S)$ can be thought of as a negative of the log-likelihood criterion $-\log(p(X|S))$, where only a single mixed signal is observed, rather than an ensemble of consistently mixed signals, as was the case in the genetics application in.

As opposed to $f(S)$ in equation (2), the new criterion $-\log(p(X|S))$ is symmetric, but not a sub-modular function. However, it is a posimodular function.

For a function $f(S)$ to be posimodular the following should hold:

$$f(A) + f(B) \geq f(A-B) + f(B-A). \qquad \text{Equation (5)}$$

Plugging $f(A) = -\log(P(X_A))$ on the above yields a posimodular inequality, which is proven by the following:

For $A = C+D$, $B = E+D$ and $D = A \cap B$. Then $f(A) = -\log(p(X_C, X_D))$ and $$f(B) = -\log(p(X_D, X_E)).$$

$$-\log(p(X_C, X_D)) + -\log(p(X_D, X_E)) \geq -\log(p(X_C)) + -\log(p(X_E)),$$

$$p(X_D|X_C) \, p(X_D|X_E) \leq 1,$$

and it well known that Queyranne's algorithm is exact for posimodular functions.

We denote $R_i$, where $i \in [1 \ldots N]$ and N is an integer, as N non-overlapping regions of V. In other words, $$V = \sum_{i=1}^{N}(R_i), R'_i = V \setminus R_i$$

as all the regions in V but $R_i$, S as a union of individual regions on region subset G, $$S = \sum_{i \in G}(R_i),$$

and $S'=V \setminus S$, as all the regions in V but the ones in S. $L(S)=\log(p(X_S|\theta))$ as the log-likelihood of signal part $X_S$ under a certain model (marginalizing over the rest of the signal as hidden) and $L_T(S)=L(S)+L(V \setminus S)$ as the total log-likelihood for partition $P=(S, V \setminus S)$ under the same model.

The queyranne's algorithm has a complexity of $O(N^3)$ and is described follows:

---
Queyranne's Algorithm
---
Initialize $R_i$ to the smallest possible elements in V, i.e. $R_i = x_i$, where i is an integer
$N_{new} = N$, where N is the number of initial regions $R_i$
While $N_{new} \geq 2$.
    S = [ ];. (Staff S with no regions $R_i$)
    $N_{tested} = 0$
    While $N_{tested} \leq N_{new} - 2$
        For all $R_i \in (V \setminus S)$
            Compute $L_T(S + R_i)$     Step (A)
        end
        $R_j \leftarrow \text{argmax}_{R_j \in (V \setminus S)} (L_T(S + R_j))$, j is an integer     Step (B)
        $S \leftarrow S + R_j$
        $N_{tested} = N_{tested} - 1$
    end
    At this point there are only two regions $R_l$ and $R_k$ that have not been added to S, l and k are integers
    $R_i \leftarrow \max(L_T(R_l), L_T(R_k))$
    Place $(R_i, V \setminus R_i)$ in the list of possible solutions
    $R_m = (R_l \cup R_k)$, regions $R_l$ and $R_k$ are merged     Step (C)
    Set $N_{new} \leftarrow N_{new} - 1$ and reindex regions
end
Choose the best solution from the list of possible solutions, the solution that maximizes $L_T(S)$.

---

Queyranne's algorithm works for any $p(X_S|\theta)$ regardless of its complexity. In an example involving an audio speech signal, speech is modeled using hidden Markov models (HMM), which are plausible to alternative segmentation solutions such as the one described by factorial HMMs. A generic speech model can be built from a database of single speaker utterances by training individual HMMs for each basic unit in the vocabulary and later concatenating the individual HMMs according to the restrictions imposed by a specific language model.

To model a composed signal each one of the sources in the mixture is modeled using the generic speech model while defining the composed output as a combination of the output from the individual HMMs as defined by a mask variable S. This composed model is known as a factorial HMM.

The joint likelihood of the model for variables $X=[x_1, x_2, \ldots, x_T]$, $S=[s_1, s_2, \ldots, s_T]$, $Z^1=[z_1^1, z_2^1, \ldots, z_T^1]$ and $Z^2=[z_1^2, z_2^2, \ldots, z_T^2]$ is defined as:

$$P(X, Z^1, Z^2, S) = \prod_{t=1}^{T} P(x_t | z_t^1, z_t^2, s_t) P(z_t^1 | z_{t-1}^1) P(z_t^2 | z_{t-1}^2)$$

For an example binary segmentation model, Binary mask $s_t$ defines segments S and $V \setminus S$. Non zero values on $s_t$ define S while zero values define $V \setminus S$. Inference of the model involved the optimization of function $Q(Z^1, Z^2, S)$, in equation $$\mathcal{L}(Q, \theta) = \max_Q \left( \sum Q(Z^1, Z^2, S) * \log \left( \frac{P(X, Z^1, Z^2, S)}{Q(Z^1, Z^2, S)} \right) \right) \quad \text{Equation (6)}$$

It is well known that the function $Q(Z^1, Z^2, S)$ that maximizes the above equation corresponds to the posterior probability $P(Z^1, Z^2, S|X)$. Consider two exact factorizations.

1. $Q_F = Q(S|Z^1, Z^2) Q(Z^1, Z^2)$ and

2. $Q_Q = Q(Z^1, Z^2|S) Q(S)$

The use of $Q_F$ would result in an inference procedure similar to the one needed for a regular HMM with $L^2$ states, where L is the number of states in the original generic speech model.

For $Q_Q$, given the oclussion model: $Q(Z^1, Z^2|S) = Q(Z^1|S) Q(Z^2|S)$ and that probabilities $P(X|Z^1, Z^2, S)$ are defined by mixtures of Gaussians with diagonal covariances. Equation (6) can be effectively decoupled optimizing each of the chains independently with individual observation dictated by the partition given by $S(S=1)$ and $V \setminus S(S=0)$, just as defined by equation (1), linking $Q_Q$ to the Queyranne's algorithm.

The algorithm separation complexity for the two considered types of $Q(Z^1, Z^2, S)$ factorization are:

1. $O(Q_Q) = (FT)^3 (2L^2)(T),$

2. $O(Q_F) = 2L^3(T),$ where F is the number of frequency bins in the representation, T the number of timeframes and L the number of states of the generic speech model.

Given that the number of total elements in the mask is FT, Queryanne's algorithm will require $(FT)^3$ iterations to find the optimal solution. Computing the log-likelihood of each partition requires computing viterbi alignments over the two chains, each with $L^2T$ complexity. The factorial optimization requires one viterbi alignment over a HMM with $L^2$ states with a $2L^3(T)$ complexity.

Both approaches are computationally intensive given factors $(FT)^3$ or $L^3$ for any practical values for F, T and L. An approximation can greatly reduce the computations required to identify an optimal solution.

For Queyranne's algorithm $Q_Q$ given that time-frequency cells belonging to any particular source occur in large clumps (local regions), it is well known that highly-intelligible separation can be achieved by limiting the masks to consist of relatively large, locally-consistent regions of labeling. The time-frequency bins are first locally grouped in consistent regions before applying Queryanne's algorithm. The well known deformable spectrograms model, as well as any other appropriate model, can be employed to find a set of N locally consistent regions for each composed signal, where N<<FT and N is an integer.

For the factorial case $Q_F$ the magnitude of $L^3$ depends entirely in the size of the vocabulary used in the training of the generic speech model, for most practical applications the value of L can easily be found in the thousands. In this case the approximation can be done, for example, by beam search, where the large state space is first locally limited to a small subspace of states that achieve high local likelihood.

For short utterances in applications with large vocabularies, which is the case for most practical applications, the use of Queryanne's algorithm is highly effective.

Since both approaches rely on approximations they both have the potential for errors. However, the deformable spectrogram model achieves a high recall value when identifying regions dominated by a single source with error due to noise resulting in false positives (over segmentation) rather than omissions of true positives. The beam search approach in other hand is very susceptible to local noise, given that local noise can divert the search to the wrong local search subspace, an error that can be easily further propagated in the subsequent frames. The potential problems are especially critical if the number of states is quite large since a workable subspace will represent just a very limited set of the possible local matches reducing in great manner the probability of obtaining the correct alignment.

Many audio signals have spectral representations that show high correlation between adjacent frames. For example, the deformable spectrogram model discovers and tracks the nature of such correlations by finding how the patterns of energy are transformed between adjacent frames and how those transformations evolve over time. FIG. 1 shows a narrow band spectrogram representation of a speech signal, where each column depicts the energy content across frequency in a short-time window, or time-frame. Using the subscript C to designate current and P to indicate previous, the deformable spectrogram model predicts a patch of $N_C$ time-frequency bins centered at the $k^{th}$ frequency bin of frame t as a "transformation" of a patch of $N_P$ bins around the $k^{th}$ bin of frame t−1, in other words:

$$\vec{X}_t^{[k-n_C, k+n_C]} \approx \vec{T}_t^k \cdot \vec{X}_{t-1}^{[k-n_P, k+n_P]}$$

where $n_C=(N_C-1)/2$, $n_P=(N_P-1)/2$, and $T_t^k$ is the particular $N_C \times N_P$ transformation matrix employed at that location on the time-frequency plane. FIG. 1 shows an example with $N_C=3$ and $N_P=5$ to illustrate the intuition behind this approach. The selected patch $N_C$ in frame t can be seen as a close replica of an upward shift of part of the patch $N_P$ highlighted in frame t−1. This "upward" relationship can be captured by a transformation matrix, such as the one shown in FIG. 1. The patch $N_P$ in frame t−1 is larger than the patch $N_C$ in frame t to permit both upward and downward motions. The deformable spectrogram model finds the particular transformation, from a discrete set of transformations, that better describes the evolution of the energy from frame t−1 to frame t around each one of the time frequency bins $x_t^k$ in the spectrogram. The model also tracks the nature of the transformations throughout the whole signal to find useful patterns of transformation. The generative graphical model is depicted in FIG. 2A and a graphical simplification of the generative graphical model is depicted in FIG. 2B. Nodes $X=\{x_1^1, x_1^2, \ldots, x_t^k, \ldots, x_T^K\}$ represents all the time-frequency bins in the spectrogram. Considering the continuous nodes X as observed or hidden when parts of the spectogram are missing, discrete nodes $T=\{T_1^1, T_1^2, \ldots, T_t^k, \ldots, T_T^K\}$ index the set of transformation matrices used to model the dynamics of the signal. Many sound sources, can be regarded as the convolution of a broad-band source excitation, and a time-varying resonant filter, therefore the overall spectrum is in essence the convolution of the source with the filter in the time domain, which corresponds to multiplying their spectra in the Fourier domain, or adding in the log-spectral domain. Hence, the log-spectra X can be modeled as the sum of variables F and H, which explicitly model the formants and the harmonics of the speech signal. The source-filter transformation model is based on two additive layers of the deformation model described above.

Figures 3A, 3B:
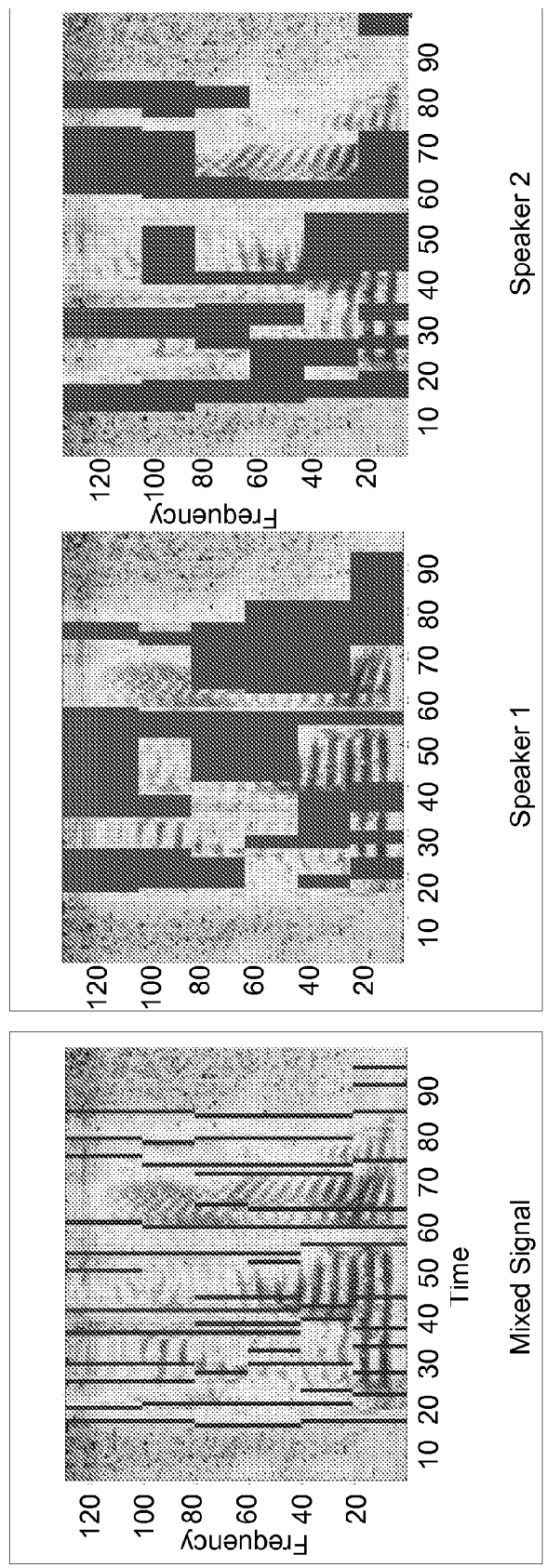
FIG. 3A illustrates an example of transition boundaries obtained by the deformable spectrogram model for a mixture of two speakers.
FIG. 3B illustrates one example of how the signal can be optimally separated by each speaker based upon the identified transition boundaries and employing Queyrannes' algorithm.

Prediction of frames from their context is not always possible such as when there are transitions between silence and speech or transitions between voiced and unvoiced speech, or when smooth regions on the energy patterns of a single source are disrupted due to interference from a new source. Given that the magnitude of the interference is not uniform across all the spectrum, the model is extended to detect "vertical" (synchronized) sections of the spectogram, composed by a band of n adjacent time frequency bins on a given time frame, where the model cannot efficiently "track" the energy dynamics from the context, labeling the frame section as a transition boundary. FIG. 3A shows an example of transition boundaries obtained by the deformable spectrogram model for a mixture of two speakers. FIG. 3B shows one example of how the signal can be optimally separated by each speaker based upon the identified transition boundaries and employing Queyrannes' algorithm.

Figure 4:
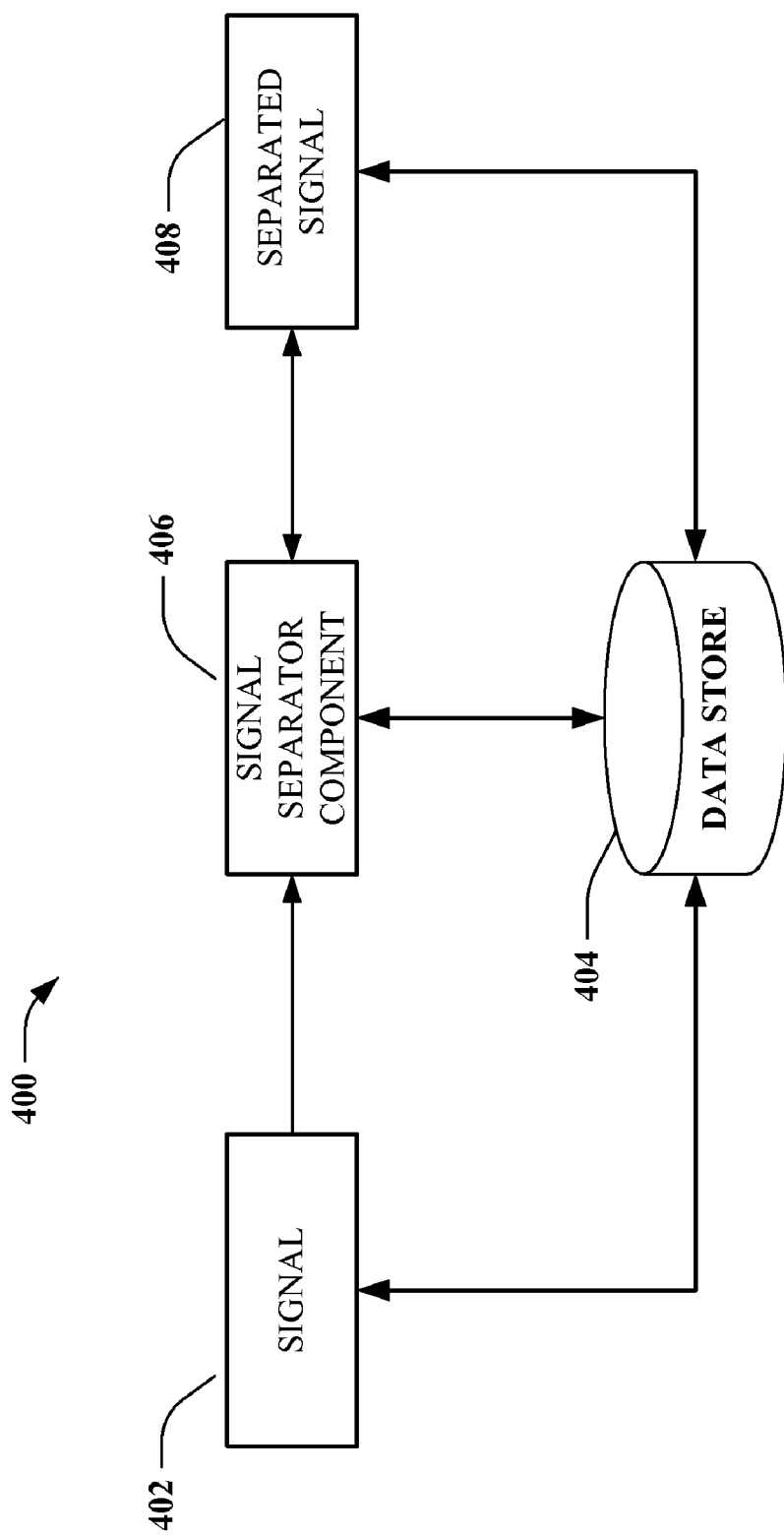
FIG. 4 illustrated a general block diagram system for separating signals according to their sources.

Referring to FIG. 4, there is illustrated a general block diagram system 400 for separating signals according to their sources. System 400 includes signal separator component 406 that receives a multidimensional signal 402 and separates the signal into a partition with two or more segments each representing portions of the signal according to their source as separated signal 408. Signal 402 can consist of any multidimensional signal such as, for example, audio, image, or video. Signal 402 can be retrieved from data store 404, received from a transmission, or provided by an appropriate input device. Optionally, signal separation component 406 can employ an appropriate local presegmentation model for the signal, such as a deformable spectrogram model for audio, to identify adjacent multidimensional bins of the signal that form locally-consistent regions. For example, in an audio signal, a group of adjacent (time, frequency) bins that are consistent with a voice can be grouped into a region, while a group of adjacent (time, frequency) bins that are consistent with background noise can be grouped into a region. Signal separator component 406, optionally groups the multidimensional bins into locally consistent regions according to the local consistency model. Signal separator component 406, employs Queyranne's algorithm to optimally place the locally consistent regions into one of two segments of a partition that maximize the loglikelihood of the resulting partition under the model in order to separate the signal into separated signal 408.

In a further option, signal separator component 406 can employ a bookkeeping technique in Queyranne's algorithm shown above at step (A). At step (A) of the algorithm the computed value of $L_T(S+R_i)$ can be stored. Then in subsequent iterations, the stored value can be reused at step (A) instead of re-computing the value. This can provide a substantial reduction in computation time. However, if at step (B) the region that provides the maximal gain is the merged region from the immediately previous iteration of step (C), then the previous computations from step (A) cannot be reused during the remainder of this iteration of the inner while loop. This is due to S containing the newly merged region and none of the previous calculations having included this merged region. In one aspect, a flag can be set to indicate when the newly merged region is selected at step (B). The algorithm can employ this flag to determine if it should access a previous computation.

In another option where the signal needs to be separated into a partition with more than two segments, a cascading execution of Queyranne's algorithm can be employed by signal separator component 406. For example, the signal may need to be separated according to three sources: A, B, and C. Signal separator component 406 can separate the signal into a partition with two segments: source A, and not source A. Then signal separator component 406 can separate the segment representing not source A into segments: source B, and source C. In an example of four sources A, B, C, and D, the initial two segments can be source A+B segment, and source C+D segment, and the second segmentation would separate A+B into two segments A and B, and separate C+D into two segments C and D.

Figure 5:
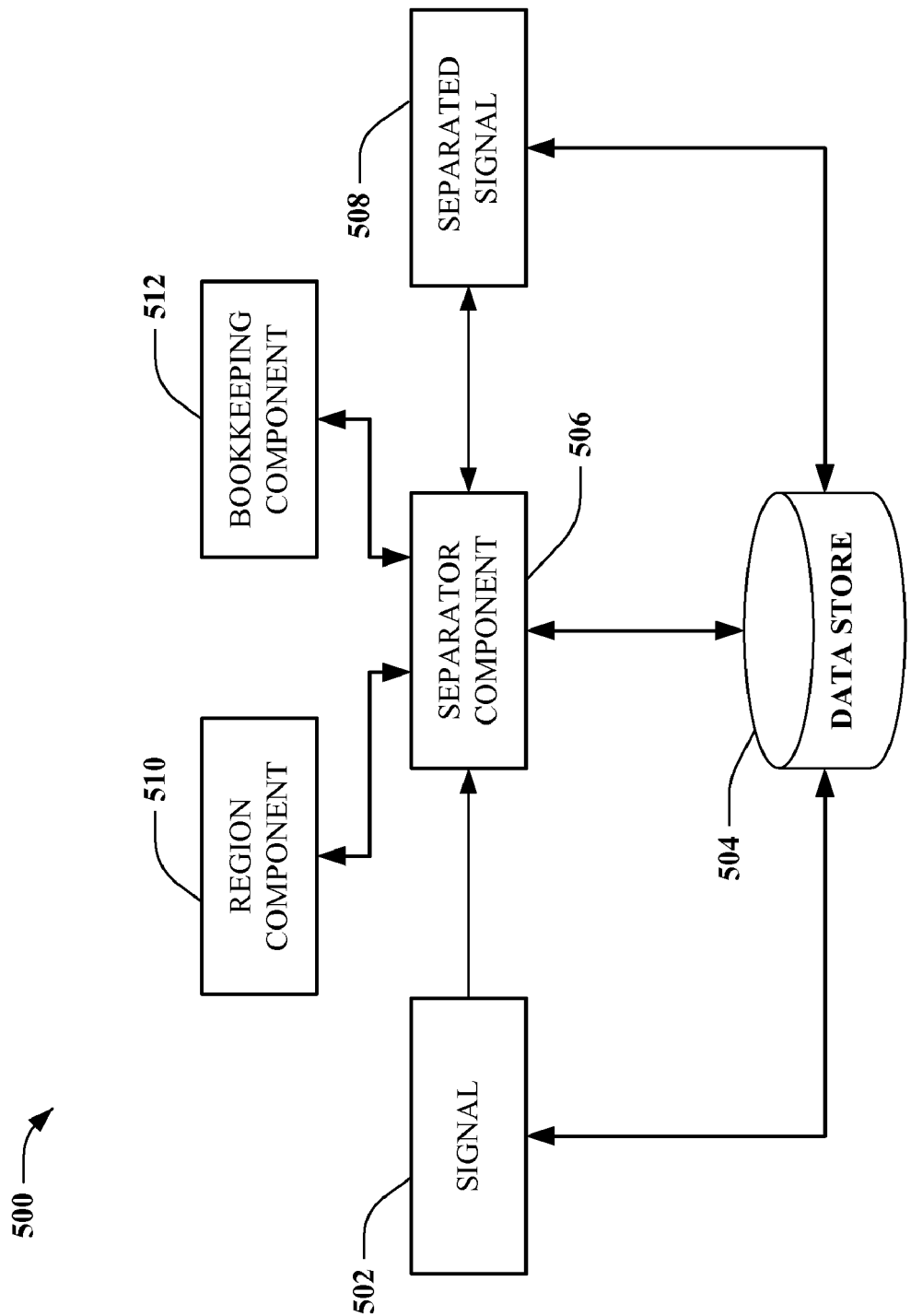
FIG. 5 illustrates a general block diagram system for separating signals according to their sources

Turning to FIG. 5, there is illustrated a general block diagram system 500 for separating signals according to their sources. System 500 includes separator component 506 that receives a multidimensional signal 502 and separates the signal into a partition with two or more segments where each segment represents the portion of the signal for a particular source as separated signal 508. Signal 502 can consist of any multidimensional signal such as, for example, audio, image, or video. Signal 502 can be retrieved from data store 504, received from a transmission, or provided by an appropriate input device. Optionally, region component 510 employs an appropriate local presegmentation model for the signal, such as a deformation spectrogram model for an audio signal, to identify adjacent multidimensional bins from a representation of the signal that form locally-consistent regions. For example, in an audio signal, a group of adjacent (time, frequency) bins that are consistent with a voice can be grouped into a region, while a group of adjacent (time, frequency) bins that are consistent with background noise can be grouped into a region. Separator component 506 optionally calls region component 510 to group the multidimensional bins into locally consistent regions according to the model. Separator component 506, employs Queyranne's algorithm to separate the signal into separated signal 508 by optimally placing the bins or locally consistent regions into a partition resulting in several segments, where each segment corresponds to a separate source, effectively separating the original mixture into its independent sources. Optionally, at step (A) of Queyrannes algorithm bookkeeping component 512 can be called to determine if a previously computed value can be reused. Separator component 506, can cascade execution of Queyranne's algorithm to separate signal 502 according to more than 2 sources, if required.

Figure 6:
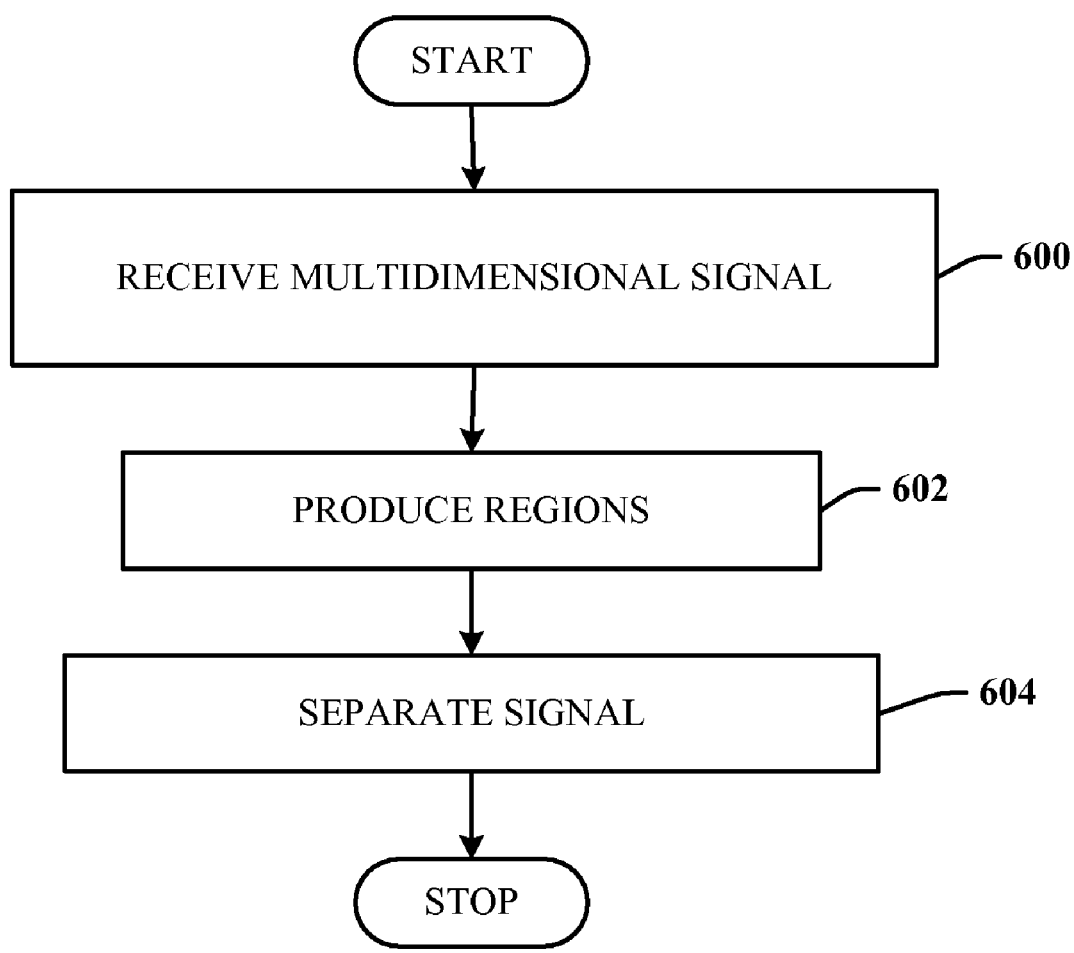
FIG. 6 illustrates a flow chart of one methodology for separating signals according to their sources.
Figure 7A:
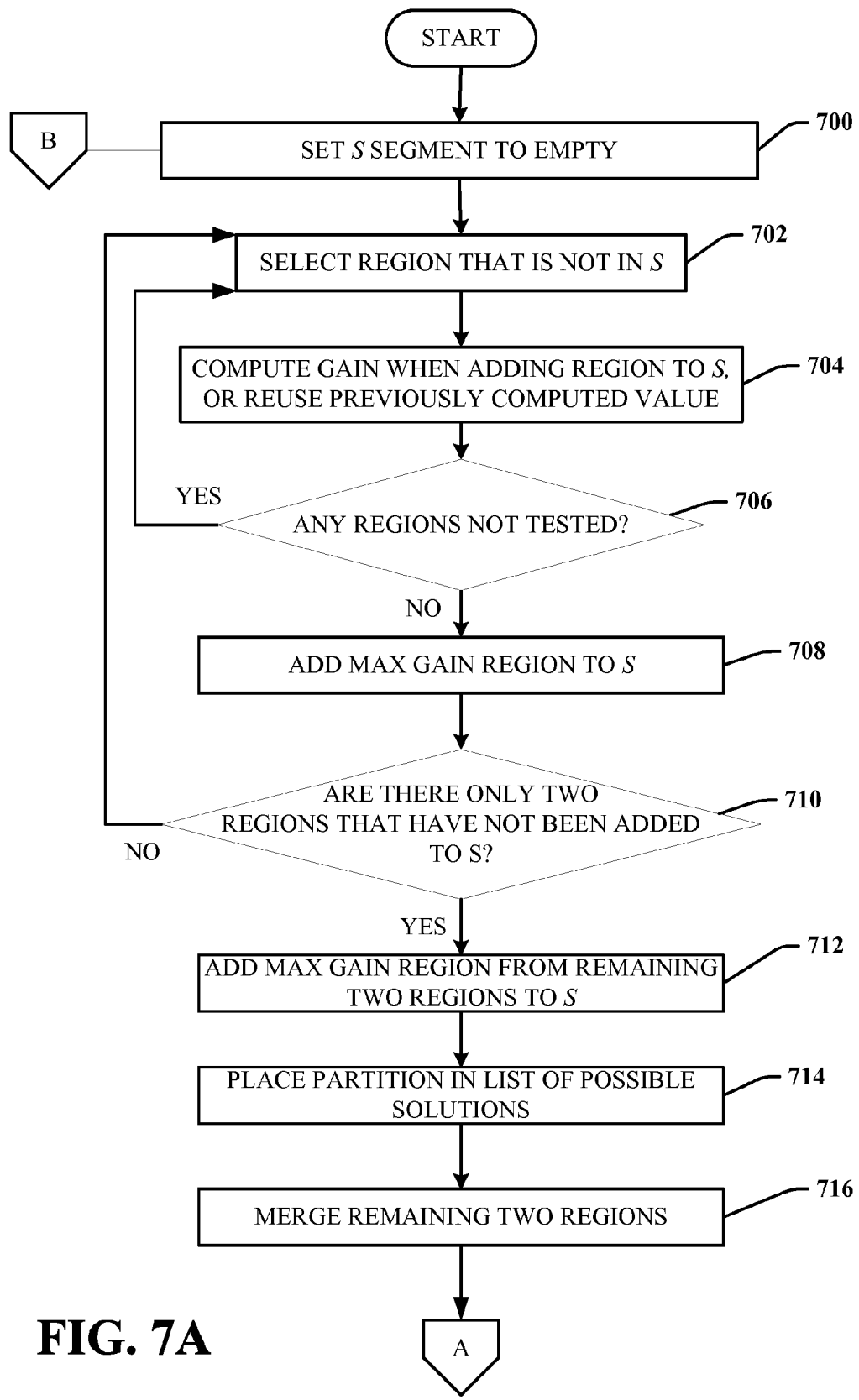
FIGS. 7A and 7B illustrate a flow chart of one methodology for employing Queyranne's algorithm to separate a signal into a partition with two segments according to a defined source separation criteria.
Figure 7B:
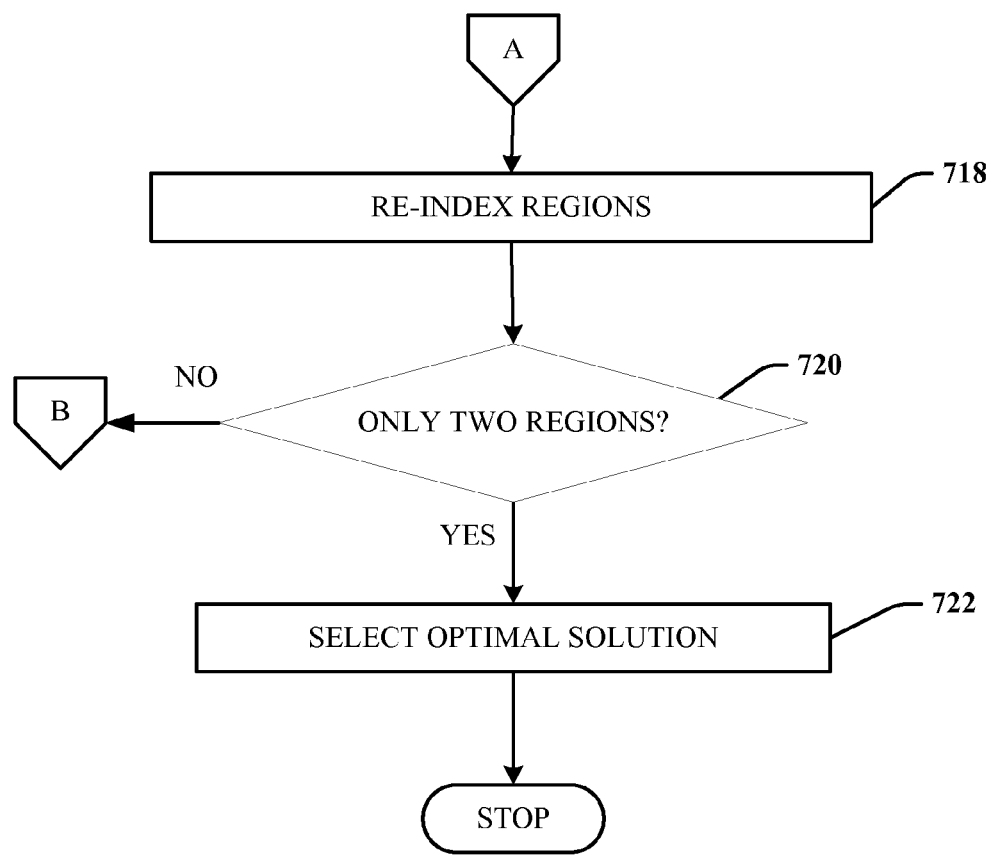
Figure 8:
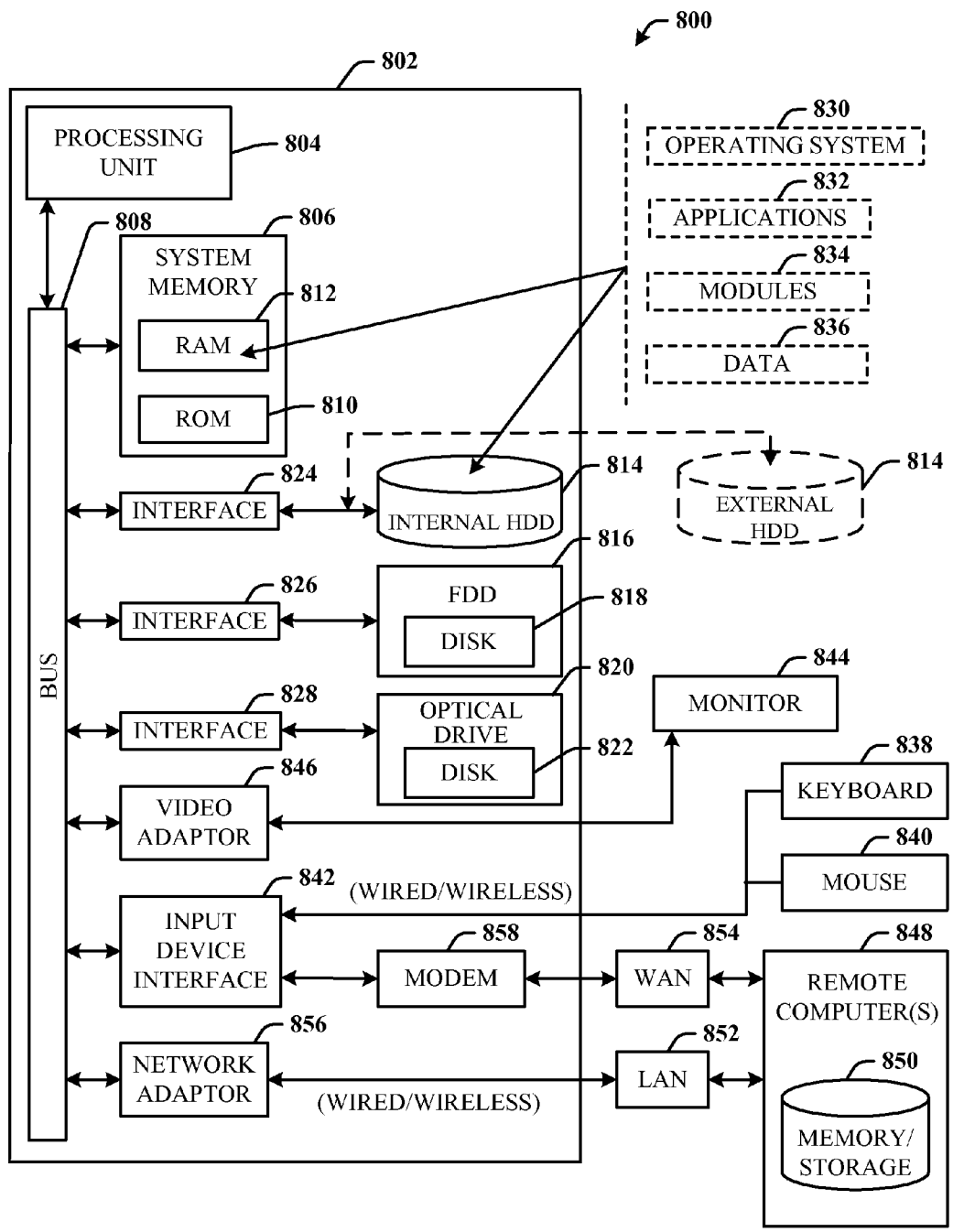
FIG. 8 illustrates a block diagram of a computer operable to execute the signal source separation architecture.

In view of the exemplary systems shown and described supra, methodologies that can be implemented in accordance with the disclosed subject matter will be better appreciated with reference to the flowcharts of FIGS. 6-8. While for purposes of simplicity of explanation, the methodologies are shown and described as a series of blocks, it is to be understood and appreciated that the claimed subject matter is not limited by the order of the blocks, as some blocks can occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules can be combined and/or distributed as desired in various aspects.

Referring now to FIG. 6, there is illustrated a flow chart of one methodology for separating signals according to their sources. At 600, a multidimensional signal is received. Optionally at 602, multidimensional bins of the signal are grouped into locally consistent regions according to an appropriate model. At 604, Queyranne's algorithm is employed to optimally place the bins or locally consistent regions into two partitions according to their respective source. Optionally at 604, a bookkeeping technique can be employed in Queyranne's algorithm at step (A). At step (A) of the algorithm the computed value of $L_T(S+R_i)$ can be stored. Then in subsequent iterations, the stored value can be reused when appropriate at step (A) instead of re-computing the value.

FIGS. 7A and 7B illustrate a flow chart of one methodology for employing Queyranne's algorithm to separate a signal into a partition with two segments according to a defined source separation criteria, such as maximizing the total loglikelihood of the signal segmentation under the generic model that generated the sources. At 700, segment S is set to not include any regions of the signal and a segment V/S is set to include all regions of the signal. At 702 a region of the signal is selected that is not in S. At 704, the gain in partition loglikelihood if the selected region is added to S is computed and the value is stored. If the value was previously calculated, the previous value is restored instead of computing the value again. At 706 a determination is made as to whether any regions that are not in segment S have not been tested at 704. If the determination at 706 is yes, then the method proceeds to 702. If the determination at 706 is no, then the method proceeds to 708. At 708, the region that had the maximum computed value when added to S at 702 is added to partition S. At 710, a determination is made regarding whether there are only two regions that have not been added to segment S. If the determination at 710 is no, then the method proceeds to 702. If the determination at 710 is yes, then the method proceeds to 712. At 712, gain in partition likelihood is computed for each of the two remaining regions that are not in S when they are added to S. The region the produces the greater gain is added to segment S. At 714, the partition of signal into regions that are in S and not in S is added to a list of possible solutions. At 716, the two remaining regions from 714 are merged into a single region. At 718, the regions, which is less one due to the merged regions, are re-indexed, for example by eliminating the two remaining regions and adding the newly merged region to the end of indexed list of regions. At 720, a determination is made whether, there are only two regions left after merging regions at 716. If the determination at 720 is no, then the method proceeds to 700. If the determination at 720 is yes, then the method proceeds to 722. At 722, the solution from the list of solutions created at 714 that provides the maximum separation of the signal with respect to the source separation criteria is selected as the optimal solution.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one-step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors that the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter can be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Referring now to FIG. 8, there is illustrated a block diagram of a computer operable to execute the disclosed system. In order to provide additional context for various aspects thereof, FIG. 8 and the following discussion are intended to provide a brief, general description of a suitable computing environment 800 in which the various aspects of the claimed subject matter can be implemented. While the description above is in the general context of computer-executable instructions that can run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 8, the exemplary environment 800 for implementing various aspects includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures can also be employed as the processing unit 804.

The system bus 808 can be any of several types of bus structure that can further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 can also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosed and claimed subject matter.

A number of program modules can be stored in the drives and RAM 812, including an operating system 830, one or more application programs 832, other program modules 834 and program data 836. All or portions of the operating system, applications, modules, and/or data can also be cached in the RAM 812. It is to be appreciated that the claimed subject matter can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) can include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc.

The computer 802 can operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which can connect to a global communications network, e.g., the Internet.

When used in a LAN networking environment, the computer 802 is connected to the local network 852 through a wired and/or wireless communication network interface or adapter 856. The adaptor 856 can facilitate wired or wireless communication to the LAN 852, which can also include a wireless access point disposed thereon for communicating with the wireless adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 9:
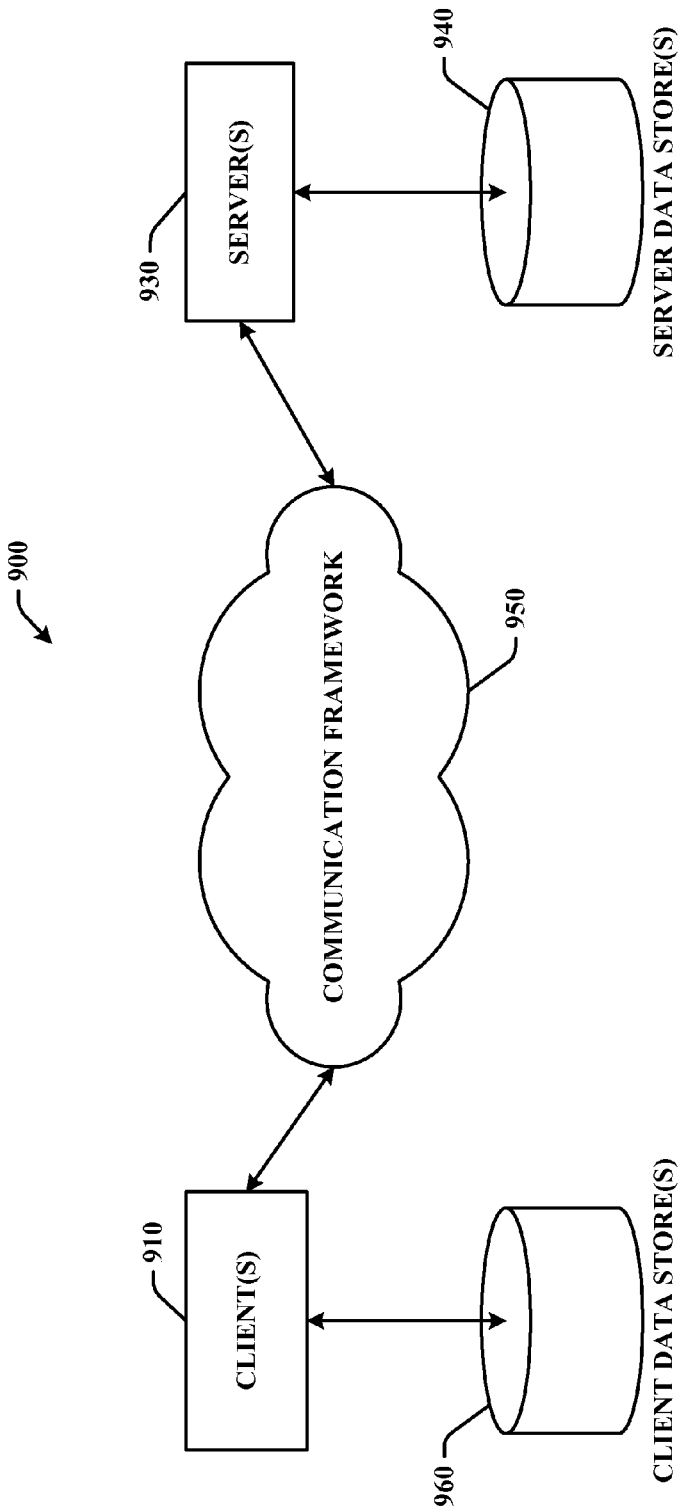
FIG. 9 illustrates a schematic block diagram of an exemplary computing environment for processing the signal source separation architecture in accordance with another aspect.

Referring now to FIG. 9, there is illustrated a schematic block diagram of an exemplary computing environment 900 for processing the inference-based query completion architecture in accordance with another aspect. The system 900 includes one or more client(s) 910. The client(s) 910 can be hardware and/or software (e.g., threads, processes, computing devices). The client(s) 910 can house cookie(s) and/or associated contextual information by employing the claimed subject matter, for example.

The system 900 also includes one or more server(s) 930. The server(s) 904 can also be hardware and/or software (e.g., threads, processes, computing devices). The servers 930 can house threads to perform transformations by employing the claimed subject matter, for example. One possible communication between a client 910 and a server 930 can be in the form of a data packet adapted to be transmitted between two or more computer processes. The data packet can include a cookie and/or associated contextual information, for example. The system 900 includes a communication framework 950 (e.g., a global communication network such as the Internet) that can be employed to facilitate communications between the client(s) 910 and the server(s) 930.

Communications can be facilitated via a wired (including optical fiber) and/or wireless technology. The client(s) 910 are operatively connected to one or more client data store(s) 960 that can be employed to store information local to the client(s) 910 (e.g., cookie(s) and/or associated contextual information). Similarly, the server(s) 930 are operatively connected to one or more server data store(s) 940 that can be employed to store information local to the servers 930.

Experimental Results

A generic speech recognizer was trained using HTK with over 3000 clean speech signals from over 50 different female speakers from the Aurora database, which is composed of utterances of sequences of three to six continuous digits. We built individual HMMs for each of the eleven words in the vocabulary corresponding to digits: 'one', 'two', 'three', 'four', 'five', 'six', 'seven', 'eight', 'nine', 'oh' and 'zeros', as well as a 'silence' and a 'short pause' models. Each digit HMM had 16 states, the 'silence' model had three states and the 'short pause' one state. Each state in turn was comprised of 7 mixtures of Gaussians with diagonal covariances.

We tested our approach on 100 artificially mixed signals from two female speakers each one uttering a sequence of three continuous digits. The speakers were not present in the training set used to train the recognizer.

Each mixture was first pre-segmented using the deformable spectogram model into regions with smooth energy patterns. Then, the Queyrannes's algorithm was applied to each oversegmented signal to obtain the best partition of the two sources.

Before continuing to the evaluation of the partitions, we briefly discuss the computation expense of the algorithm. The algorithm requires up to $N^3$ evaluations under the speech decoder. This is quite a reduction from $2^N$ evaluations needed for the exhaustive search, and this makes this algorithm possible to evaluate. In fact, taking a closer look to the algorithm it becomes apparent that many of those evaluations are repeated and so recording the indexes of the original regions already tested in a hash table greatly reduces the actual number of evaluations needed. Table 1 shows the mean and the standard deviation of the ratio between the actual number of evaluations used to complete the algorithm for each mixture and the expected $N^3$ number of evaluations. The total number of calls to speech recognizer was only around 5% of the worst case $N^3$ calls.

TABLE 1

Computation Cost

| Num. Evaluations Ratio | Mean | Std |
|---|---|---|
| Actual Number/$N^3$ | 0.054 | 0.011 |

TABLE 2

Performance Evaluation

| Partition | Log-likelihood | Word Reconition Rate |
|---|---|---|
| $P_{est}$ | −7.1220e+003 | 79.83% |
| $P_{opt}$ | −73487e+003 | 83.50% |

Given that the signals were artificially mixed we could obtain the "optimal" grouping of the dominant speaker regions by assigning each region to the speaker for which the amount of energy contained in its individual source is greater. We called this partition $P_{opt}$. Table 2 shows performance comparisons for both set of partitions $P_{est}$ and $P_{opt}$. The first column shows the mean for the partition log-likelihood for all mixture. In each single one of the mixtures the log-likelihood of partition $P_{est}$ is greater than the log-likelihood obtained from partition $P_{opt}$, which indicates both that the optimization algorithm is working well, and that the generic model is under-trained. Second row shows the word recognition rate over the 600 hundred decoded digits, 3 per independent source over the 100 mixtures.

The test set included a few mixtures containing the same speaker uttering two different digits sequences. The word error rate on those mixtures is consistent with the one obtained for the complete test set.

What has been described above includes examples of the disclosed and claimed subject matter. It is, of course, not possible to describe every conceivable combination of components and/or methodologies, but one of ordinary skill in the art can recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for separating a multidimensional signal according to signal sources comprising:
   the multidimensional signal being described as a combination of at least two sources; and
   a separator component that employs Queyranne's algorithm to separate the multidimensional signal into at least two sources so as to optimize a likelihood of the multidimensional signal according to source models.

2. The system of claim 1, wherein the multidimensional signal is at least one of audio, image, or video.

3. The system of claim 1, wherein the separator component combines elements of the multidimensional signal into locally consistent regions prior to employing Queyranne's algorithm.

4. The system of claim 3, wherein the separator component employs a deformation spectrogram model to combine elements of the multidimensional signal into locally consistent regions.

5. The system of claim 1, wherein the separator component stores a computed gain in partition likelihood for adding a region to a partition, and reuses stored gain when the same computation is required again.

6. The system of claim 3, wherein the separator component employs a randomly selected subset of regions during each iteration of Queyranne's algorithm.

7. The system of claim 1, wherein the separator component further separates at least one of the separated signals according to at least two additional sources.

8. The system of claim 1, wherein the signal is separated in order to isolate a voice from background noise.

9. The system of claim 1, wherein the signal is separated in order to isolate an object in a video from everything in the video that is not the object.

10. The system of claim 1, wherein the signal is separated in order to isolate an object in an image from everything in the image that is not the object.

11. A method for separating a multidimensional signal according to signal sources comprising:
   receiving a multidimensional signal that can be separated according to at least two sources; and
   employing Queyranne's algorithm to separate the signal according to the at least two sources.

12. The method of claim 11, wherein the multidimensional signal is at least one of audio, image, or video.

13. The method of claim 11, further comprising combining elements of the multidimensional signal into locally consistent regions prior to employing Queyranne's algorithm.

14. The method of claim 13, further comprising employing a deformation segmentation model to combine elements of the multidimensional signal into locally consistent regions.

15. The method of claim 11, further comprising storing a computed gain in partition likelihood when adding a region to a partition, and reusing the stored gain when the same computation is required again.

16. The method of claim 13, further comprising employing a randomly selected subset of regions during each iteration of Queyranne's algorithm.

17. A system for separating a multidimensional signal according to signal sources comprising:
   an input device interface to receive a multidimensional signal that can be separated according to at least two sources; and a separator component to employ Queyranne's algorithm to separate the signal according to the at least two sources.

18. The system of claim 17, wherein the separator component is configured for combining elements of the multidimensional signal into locally consistent regions prior to employing Queyranne's algorithm.

19. The system of claim 18, wherein the separator component is configured for employing a deformation segmentation model to combine elements of the multidimensional signal into locally consistent regions.

20. The system of claim 17, wherein the separator component is configured for:
storing a computed gain in partition likelihood when adding a region to a partition; and
reusing the stored gain when the same computation is required again.

* * * * *